US012411535B2

(12) United States Patent
Hong et al.

(10) Patent No.: US 12,411,535 B2
(45) Date of Patent: Sep. 9, 2025

(54) ELECTRONIC APPARATUS AND RESPONSE OPERATION METHOD FOR ELECTRONIC APPARATUS

(71) Applicant: HUAWEI TECHNOLOGIES CO., LTD., Guangdong (CN)

(72) Inventors: Yumeng Hong, Shanghai (CN); Zhenhua Ge, Shenzhen (CN); Songlin Chen, Nanjing (CN); Jiaxiong Yao, Shenzhen (CN); Qi Yang, Shanghai (CN); Cuijun Liu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 207 days.

(21) Appl. No.: 18/176,261

(22) Filed: Feb. 28, 2023

(65) Prior Publication Data
US 2023/0205296 A1 Jun. 29, 2023

Related U.S. Application Data

(63) Continuation of application No. PCT/CN2020/112588, filed on Aug. 31, 2020.

(51) Int. Cl.
*G06F 1/3203* (2019.01)
*G01J 1/42* (2006.01)
*G06T 1/00* (2006.01)
*H04N 23/65* (2023.01)

(52) U.S. Cl.
CPC .......... *G06F 1/3203* (2013.01); *G01J 1/4204* (2013.01); *G06T 1/0007* (2013.01); *H04N 23/651* (2023.01)

(58) Field of Classification Search
CPC .... G06F 1/3203; G06F 1/3215; G06F 1/3228; G06F 1/3243; G06F 3/017; G06F 3/0304; G06T 1/0007
See application file for complete search history.

(56) References Cited

U.S. PATENT DOCUMENTS

| | | | |
|---|---|---|---|
| 9,483,758 B2 | 11/2016 | Rhee et al. | |
| 2011/0134250 A1* | 6/2011 | Kim | G06F 1/1605 |
| | | | 348/E5.09 |
| 2014/0118246 A1 | 5/2014 | Park et al. | |

(Continued)

FOREIGN PATENT DOCUMENTS

| | | |
|---|---|---|
| CN | 104102863 A | 10/2014 |
| CN | 104267819 A | 1/2015 |

(Continued)

*Primary Examiner* — Raymond N Phan

(57) ABSTRACT

An electronic apparatus includes a controller, an image signal processor, an artificial intelligence AI processor, and a central processing unit. The processor is configured to: obtain a first signal that indicates a light intensity variation from an ambient light sensor, and trigger, based on the first signal, a camera apparatus to collect a first image. The image signal processor is configured to: receive the first image from the camera apparatus, process the first image to generate a second image, and provide the second image to the AI processor. The AI processor detects the second image to obtain an image detection result. The central processing unit is configured to perform a response operation based on the image detection result.

23 Claims, 10 Drawing Sheets

(56) References Cited

U.S. PATENT DOCUMENTS

| | | | |
|---|---|---|---|
| 2014/0149754 A1* | 5/2014 | Silva | G06F 3/017 |
| | | | 713/300 |
| 2015/0229997 A1* | 8/2015 | Park | H04N 21/41265 |
| | | | 725/38 |
| 2019/0379812 A1 | 12/2019 | Suman et al. | |
| 2020/0267824 A1* | 8/2020 | Tan | H05B 47/12 |
| 2020/0382719 A1* | 12/2020 | Lee | H04N 23/617 |
| 2022/0253144 A1 | 8/2022 | Hu et al. | |
| 2022/0413592 A1* | 12/2022 | Madar, III | G06F 1/325 |

FOREIGN PATENT DOCUMENTS

| | | | | |
|---|---|---|---|---|
| CN | 104866083 A | 8/2015 | | |
| CN | 104932697 A | 9/2015 | | |
| CN | 104951078 A | 9/2015 | | |
| CN | 104978014 A | 10/2015 | | |
| CN | 105659522 A | 6/2016 | | |
| CN | 105929994 A | 9/2016 | | |
| CN | 106453930 A | 2/2017 | | |
| CN | 106484271 A | 3/2017 | | |
| CN | 106982273 A | 7/2017 | | |
| CN | 107807778 A | 3/2018 | | |
| CN | 108803896 A | 11/2018 | | |
| CN | 109079809 A | 12/2018 | | |
| CN | 109389731 A | 2/2019 | | |
| CN | 109951595 A | 6/2019 | | |
| CN | 110058777 A | 7/2019 | | |
| CN | 110298161 A | 10/2019 | | |
| CN | 110321812 A | 10/2019 | | |
| CN | 111103963 A | 5/2020 | | |
| EP | 3736665 A1 * | 11/2020 | | G06F 3/0487 |
| KR | 20100127525 A | 12/2010 | | |

* cited by examiner

| AI processor 102 | | Image signal processor 104 | | Camera apparatus 105 | |
|---|---|---|---|---|---|
| 0 | 0 | 0 | 0 | 1 | 0 |

FIG. 3

ELECTRONIC APPARATUS AND RESPONSE OPERATION METHOD FOR ELECTRONIC APPARATUS

CROSS-REFERENCE TO RELATED DISCLOSURES

This disclosure is a continuation of International Disclosure No. PCT/CN2020/112588, filed on Aug. 31, 2020, the disclosure of which is hereby incorporated by reference in its entirety.

TECHNICAL FIELD

Embodiments of this disclosure relate to the field of electronic science and technology, and in particular, to an electronic apparatus and a response operation method for an electronic apparatus.

BACKGROUND

With development of electronic science and technology, an artificial intelligence (AI) technology has been developed rapidly. The AI technology has penetrated into various fields such as the biometric recognition field, the smart robot field, the medical field, and the self-driving field, making rapid advances in technologies in the various fields. The AI technology usually includes a biometric recognition technology, a speech recognition technology, a speech synthesis technology, an image processing technology, and the like.

Especially in the terminal field, the AI technology is used to provide a user with a service such as smart payment or smart screen on. After a screen is turned on, a terminal may further perform another response operation for the user. Therefore, the screen on service is a service that facilitates a subsequent response operation or interaction, so that the user can continue to use the terminal. The smart screen on service applied to the terminal usually includes touch-based screen on and non-touch-based screen on. Non-touch-based screen on means that the user may turn on a screen of an electronic device without touching the electronic device. Currently, in a screen on technology, to turn on the screen in a timely and accurate manner when the user triggers screen on, the electronic device usually needs to run a sensor and a detection model in real time to detect a user action. When the user action meets a preset condition, the terminal may turn on the screen. Once the preset condition is met, in addition to turning on the screen, the terminal may further trigger one or more other response operations for the user, for example, a voice response. However, when the sensor and the detection model are run in real time, power consumption of the electronic device is severely increased, and a standby time of the electronic device is reduced. Therefore, how to reduce the power consumption of the electronic device while ensuring that the terminal can quickly perform a response operation becomes a problem that needs to be resolved.

SUMMARY

This disclosure provides an electronic apparatus and a method for to reduce power consumption of the electronic apparatus when a response operation can be effectively performed at the reduced power level. To achieve the foregoing objective, the following technical solutions are used in this disclosure.

According to a first aspect, an embodiment of this disclosure provides an electronic apparatus. The electronic apparatus includes a controller, an image signal processor, a central processing unit, and an artificial intelligence AI processor. The controller is configured to: obtain a first signal that indicates a light intensity variation from an ambient light sensor, and trigger, based on the first signal, a camera apparatus to collect a first image. The image signal processor is configured to: receive the first image from the camera apparatus, process the first image to generate a second image, and provide the second image to the AI processor. The AI processor detects the second image to obtain an image detection result. The central processing unit is configured to perform a response operation based on the image detection result.

The controller triggers, based on the light intensity variation or variation value information of ambient light intensity, the camera apparatus to collect an image, and further triggers, based on the image detection result, the electronic apparatus to perform a response operation. In this way, the camera apparatus can be triggered by the light intensity variation to work, to save electric energy of the electronic apparatus, so that a standby time of the electronic apparatus is prolonged when the electronic apparatus can perform a response operation.

Based on the first aspect, in a possible implementation, the electronic apparatus further includes the ambient light sensor, configured to generate the first signal based on the light intensity variation.

Based on the first aspect, in a possible implementation, the electronic apparatus further includes the camera apparatus, configured to collect the first image based on trigger of the controller.

Based on the first aspect, in a possible implementation, the ambient light sensor and the camera apparatus are integrated to form a same module.

Based on the first aspect, in a possible implementation, the controller is further configured to trigger, based on the first signal, the AI processor to detect the second image; and the AI processor is configured to detect the second image based on trigger of the controller, to obtain the image detection result.

Based on the first aspect, in a possible implementation, the AI processor is further configured to send a second signal indicating that detection of the second image is completed to the controller; and the controller is further configured to control, in response to the second signal, the AI processor to enter a low power state.

The AI processor performs a large amount of calculation, and therefore the AI processor usually has relatively large power consumption. In this implementation, the AI processor is triggered to work, and is in the low power state in other time. Therefore, power consumption of the AI processor can be reduced.

Based on the first aspect, in a possible implementation, the image signal processor is further configured to send a third signal indicating that processing of the first image is completed to the controller; and the controller is further configured to control, in response to the third signal, the image signal processor to enter a low power state.

In this implementation, the image processor is triggered to work, and is in the low power state in other time. Therefore, power consumption of the image processing apparatus can be reduced.

Based on the first aspect, in a possible implementation, the controller is further configured to control, in response to the third signal, the camera apparatus to enter a low power state.

Based on the first aspect, in a possible implementation, the low power state includes at least one of the following: a standby state, a power-off state, or a sleep state.

Based on the first aspect, in a possible implementation, the controlling at least one of the AI processor, the image signal processor, or the camera apparatus to enter a low power state includes at least one of the following: turning off a supply voltage of the corresponding component, turning off a clock of the corresponding component, lowering a frequency of a clock of the corresponding component, or lowering a supply voltage of the corresponding component.

Based on the first aspect, in a possible implementation, the response operation includes controlling a screen corresponding to the electronic apparatus to be turned on.

Based on the first aspect, in a possible implementation, image detection performed by the artificial intelligence processor includes one of the following: facial image detection or gesture image detection.

According to a second aspect, an embodiment of this disclosure provides a response operation method for an electronic apparatus. The response operation method includes: obtaining, by using an ambient light sensor, a first signal that indicates a light intensity variation; triggering, based on the first signal, a camera apparatus to collect a first image; processing the first image to generate a second image; detecting the second image to obtain an image detection result; and performing a response operation based on the image detection result.

Based on the second aspect, in a possible implementation, the detecting the second image to obtain an image detection result includes: triggering, based on the first signal, an AI processor to detect the second image, to obtain the image detection result.

Based on the second aspect, in a possible implementation, after the detecting, by an AI processor, the second image, the method further includes: controlling the AI processor to enter a low power state.

Based on the second aspect, in a possible implementation, after the processing the first image to generate a second image, the method further includes: controlling an image signal processor that processes the first image to enter a low power state.

Based on the second aspect, in a possible implementation, the response operation includes controlling a screen corresponding to the electronic apparatus to be turned on.

Based on the second aspect, in a possible implementation, image detection performed by the artificial intelligence processor includes one of the following: facial image detection or gesture image detection.

According to a third aspect, an embodiment of this disclosure provides a chipset, including a controller, an image signal processor, a central processing unit, and an artificial intelligence AI processor. The chipset includes one or more chips.

According to a fourth aspect, an embodiment of this disclosure provides an apparatus. The apparatus includes: a first signal obtaining module, configured to obtain, by using an ambient light sensor, a first signal that indicates a light intensity variation; a control module, configured to trigger, based on the first signal, a camera apparatus to collect a first image; an image signal processing module, configured to process the first image to generate a second image; an AI processing module, configured to detect the second image to obtain an image detection result; and a response operation module, configured to perform a response operation based on the image detection result.

Based on the fourth aspect, in a possible implementation, the control module is further configured to trigger, based on the first signal, the AI processor to detect the second image, to obtain the image detection result.

Based on the fourth aspect, in a possible implementation, the control module is further configured to: after the AI processor detects the second image, control the AI processor to enter a low power state.

Based on the fourth aspect, in a possible implementation, the control module is further configured to: after the first image is processed to generate the second image, control the image signal processor that processes the first image to enter a low power state.

Based on the fourth aspect, in a possible implementation, the response operation includes controlling a screen corresponding to the apparatus to be turned on.

According to a fifth aspect, an embodiment of this disclosure provides an electronic apparatus. The electronic apparatus includes a memory and at least one processor. The memory is configured to store a computer program. The at least one processor is configured to invoke all or a part of the computer program stored in the memory to perform the method according to the second aspect.

According to a sixth aspect, an embodiment of this disclosure provides a system on chip. The system on chip includes at least one processor and an interface circuit. The interface circuit is configured to obtain a computer program from an outside of the system on chip. When the computer program is executed by the at least one processor, the method according to the second aspect is implemented.

According to a seventh aspect, an embodiment of this disclosure provides a computer-readable storage medium. The computer-readable storage medium stores a computer program. When the computer program is executed by at least one processor, the method according to the second aspect is implemented.

According to an eighth aspect, an embodiment of this disclosure provides a computer program product. When the computer program product is executed by at least one processor, the method according to the second aspect is implemented.

It should be understood that technical solutions in the second aspect to the eighth aspect of this disclosure are consistent with those in the first aspect of this disclosure, and similar beneficial effect is achieved in the aspects and the corresponding feasible implementations, and are not described.

BRIEF DESCRIPTION OF DRAWINGS

To describe the technical solutions in embodiments of this disclosure more clearly, the following briefly describes the accompanying drawings for describing embodiments. It is clear that the accompanying drawings in the following description show merely some embodiments of this disclosure, and a person of ordinary skill in the art may still derive other drawings from these accompanying drawings without creative efforts.

FIG. 3 is a schematic diagram of a bitmap for waking up each component or indicating each component to enter a low power state according to an embodiment of this disclosure;

DESCRIPTION OF EMBODIMENTS

The following clearly describes the technical solutions in embodiments of this disclosure with reference to the accompanying drawings in embodiments of this disclosure. It is clear that the described embodiments are some but not all of embodiments of this disclosure. All other embodiments obtained by a person of ordinary skill in the art based on embodiments of this disclosure without creative efforts shall fall within the protection scope of this disclosure.

"First" or "second" and similar words in this specification do not mean any sequence, quantity, or importance, and are merely used to distinguish between different components. Likewise, "a/an", "one", or the like is not intended to indicate a quantity limitation either, but is intended to indicate existing at least one. Similar words such as "coupling" are not limited to direct physical or mechanical connections, but may include electrical connections. A direct connection or an indirect connection is equivalent to a connection in a broad sense.

In embodiments of this disclosure, the word "example", "for example", or the like is used to represent giving an example, an illustration, or a description. Any embodiment or design scheme described as an "example" or "for example" in embodiments of this disclosure should not be explained as being more preferred or having more advantages than another embodiment or design scheme. Exactly, use of the word "example", "for example", or the like is intended to present a related concept in a specific manner. In descriptions of embodiments of this disclosure, unless otherwise stated, "a plurality of" means two or more than two. For example, "a plurality of processors" means two or more processors.

Figure 1A:
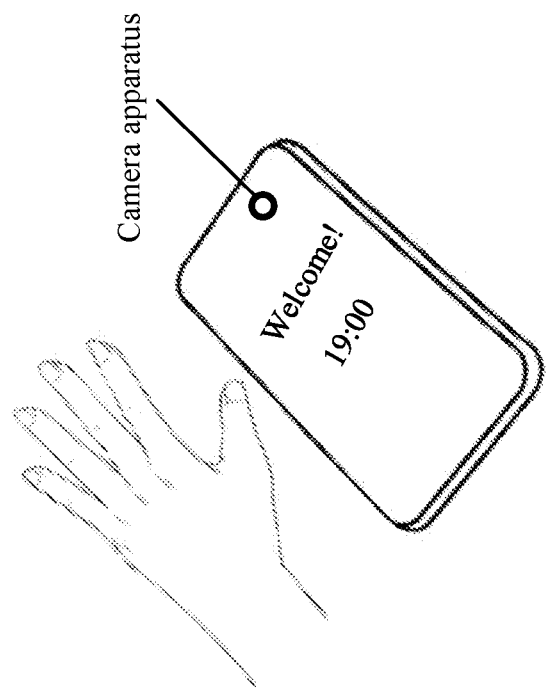
FIG. 1a to FIG. 1c are schematic diagrams of disclosure scenarios applied to an embodiment of this disclosure.
Figure 1A:
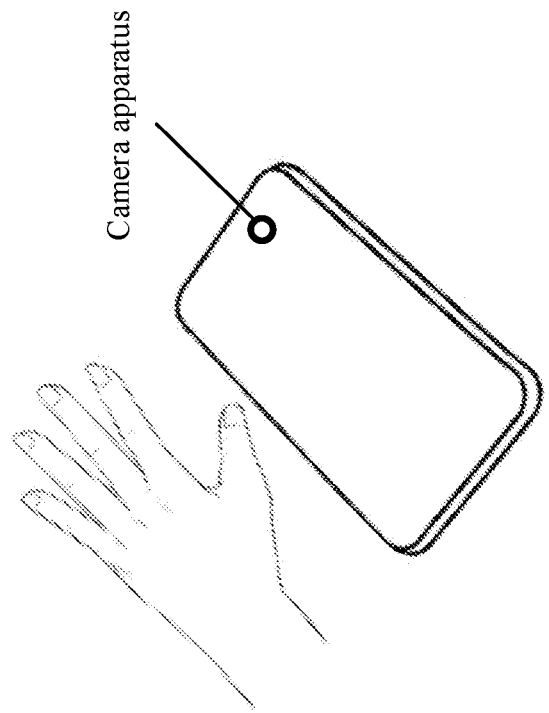
Figure 1B:
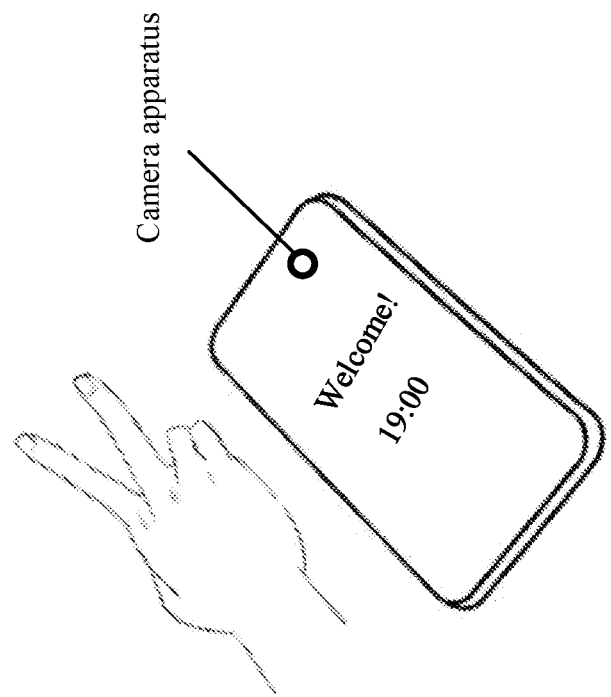
Figure 1B:
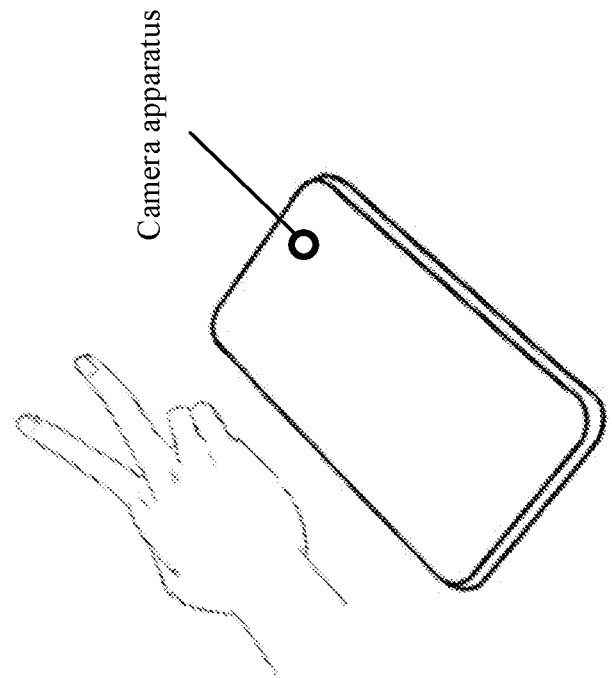
Figure 1C:
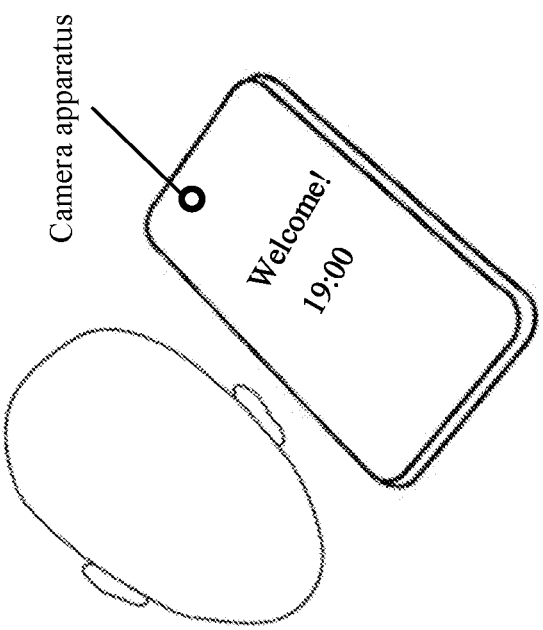
Figure 1C:
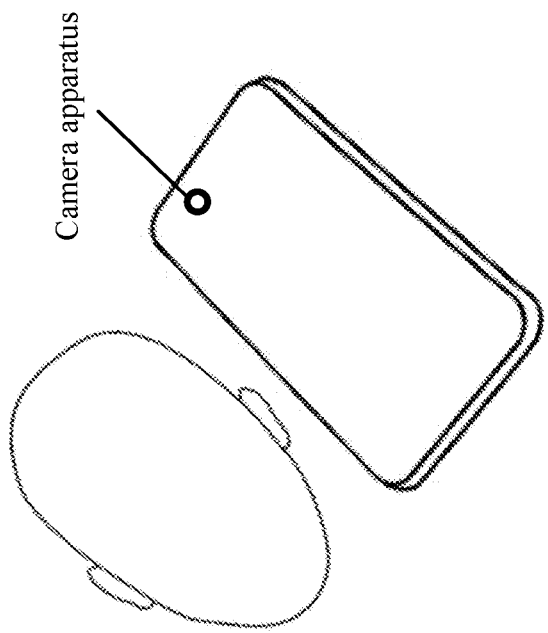

An electronic apparatus provided in an embodiment of this disclosure may be an electronic device or a module, a chip, a chipset, a circuit board, or a component integrated into an electronic device. The electronic device may be user equipment (UE), for example, various types of portable devices such as a mobile phone, a tablet computer, or a wearable device (for example, a smart watch). A screen and a camera apparatus may be installed in the electronic device. When the screen is in an off state, a user may make a preset gesture in front of the camera apparatus, extend a palm towards the front of the camera apparatus, or face the camera apparatus, to wake up and turn on the screen, that is, an image collected by the image apparatus is analyzed or processed by the electronic device to trigger screen on. As shown in FIG. 1a to FIG. 1c, FIG. 1a shows an example of a case when the screen is off, the user extends the palm towards the camera apparatus, to wake up and turn on the screen, FIG. 1b shows an example of a case when the screen is off, the user makes the preset gesture towards the camera apparatus, to wake up and turn on the screen, and FIG. 1c shows an example of a case when the screen is off, the user moves the face close to the camera apparatus, to wake up and turn on the screen. It should be noted that the turning on the screen in this embodiment of this disclosure may mean that in some scenarios, only the screen is turned on to display a screen saver interface, and no unlocking is performed to enter a home screen, or may mean that in some other scenarios, the screen is turned on, and unlocking is performed to enter a home screen. A specific scenario may be determined based on selection of the user and a requirement in an actual scenario.

It should be understood that in the foregoing description, the solution is described by using screen on as an example. However, in actual disclosure, after an image collected by a camera is analyzed or processed, another response operation, for example, a voice response, performed by the electronic device may be triggered. For example, when detecting the preset gesture or the face, the electronic device may play a preset piece of voice, for example, music. It may be understood that the response operation is a corresponding operation performed for an image detection or analysis result, and there may be a plurality of different implementation solutions. In the embodiments, only screen on is subsequently used as an example for description, but possible implementation solutions of embodiments are not limited thereto.

Figure 2A:
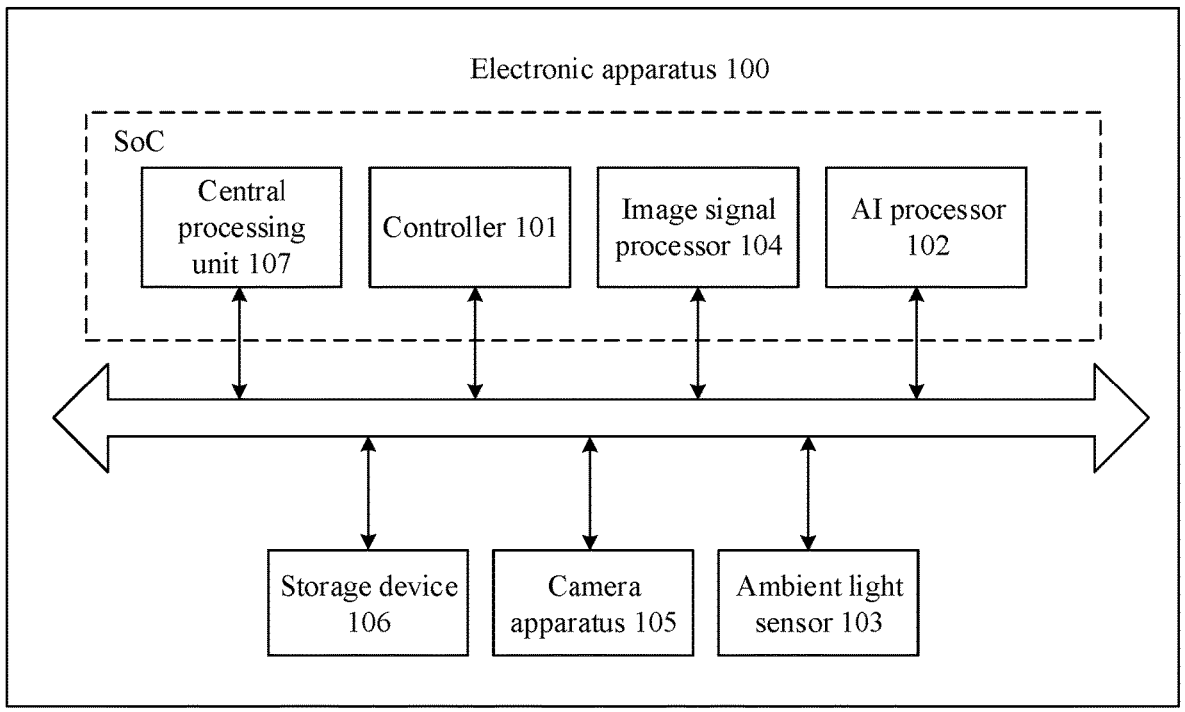
FIG. 2a is a schematic diagram of a hardware structure of an electronic apparatus according to an embodiment of this disclosure.
Figure 2B:
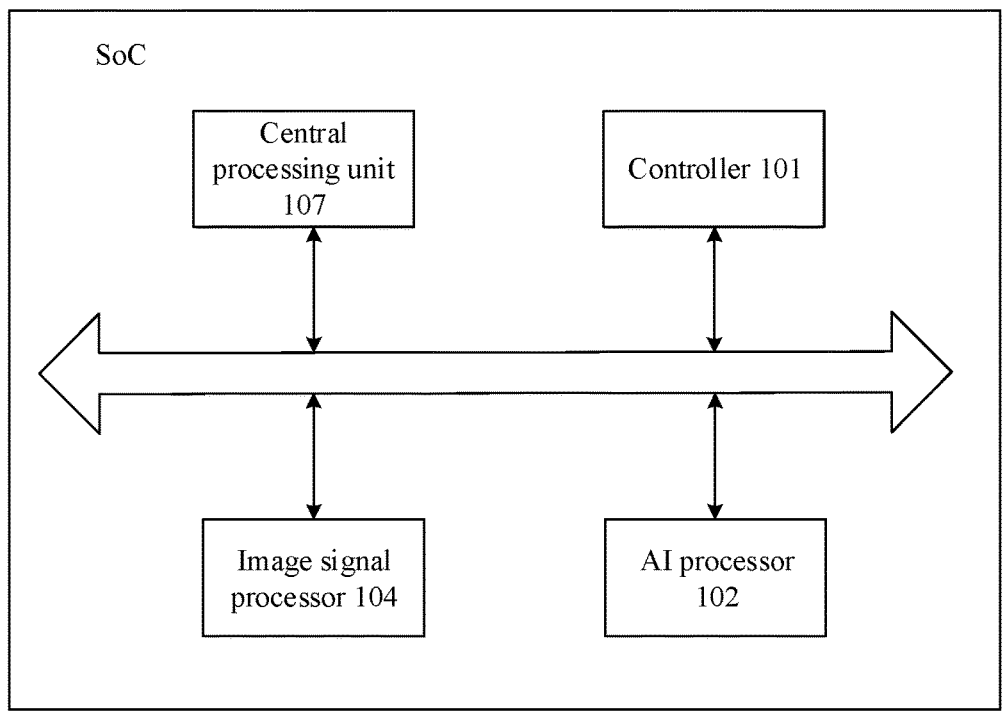
FIG. 2b is a schematic diagram of a component integrated into a system on chip according to an embodiment of this disclosure.

Based on the disclosure scenarios shown in FIG. 1a to FIG. 1c, FIG. 2a is a schematic diagram of a hardware structure of an electronic apparatus according to an embodiment of this disclosure. The electronic apparatus 100 may be specifically a chip, a chipset, a circuit board on which a chip or a chipset is mounted, or an electronic device that includes a circuit board. Details of the electronic device are described above, and are omitted herein. The chip, the chipset, or the circuit board on which a chip or a chipset is mounted may work when being driven by necessary software. In subsequent embodiments, an example that the electronic apparatus 100 is an electronic device is used for description. However, this is not used to limit the solutions. The electronic apparatus 100 shown in FIG. 1a to FIG. 1c includes one or more processors, for example, a controller 101, an AI processor 102, a central processing unit (CPU) 107, and an image signal processor 104. Optionally, the one or more processors may be integrated into one or more chips, and the one or more chips may be considered as a chipset. A plurality of processors, for example, the controller 101, the AI processor 102, the central processing unit 107, and the image signal processor 104, in FIG. 2a are integrated into a same chip. When the one or more processors are integrated into a same chip, the chip is also referred to as a SoC (System on Chip). FIG. 2b is a schematic diagram of a component integrated into an SoC according to an embodiment of this disclosure. In addition to the one or more processors, the electronic apparatus 100 further includes one or more other necessary components, for example, a storage device 106, a camera apparatus 105, and an ambient light sensor (ALS) 103.

With respect to FIG. 2a, the controller 101 may be a dedicated processor in data communication with the central processing unit 107 in the electronic device. Specifically, the controller 101 may be a smart sensor hub, and is configured to collect sensor data and control a sensor. Necessary software programs or software plug-ins such as operating system software and disclosure software may be run in the central processing unit 107. The central processing unit 107 is configured to execute a screen on disclosure such as a user interface (UI) to perform a screen on operation. The screen on disclosure may provide screen on services in various disclosure scenarios shown in FIG. 1a to FIG. 1c. The screen on disclosure may be run when the electronic device is powered on, or may be run based on a setting of a user (for example, the user starts the screen on disclosure to indicate the screen on disclosure to run). A scenario in which the electronic device is powered on may include but is not limited to powering on and starting the electronic device. The electronic device may be in a high power state or a screen on state after being powered on and started. Optionally, the electronic device may enter a standby state or a low power state after being powered on and started. In addition, the user may further interact with the electronic device to customize various personalized services provided by the screen on disclosure, for example, select a hand or a face to turn on a screen, and display only a screen saver interface after the screen is turned on, or directly enter a home screen of the electronic device. After the screen on disclosure is started, the controller 101 may be continuously in a power-on state, namely, a working state, to periodically detect whether there is a signal that indicates a light intensity variation, and when the signal that indicates the light intensity variation is detected, trigger the camera apparatus 105 shown in FIG. 2a to obtain a first image. The camera apparatus 105 provides the obtained first image to the image signal processor 104. The image signal processor 104 processes the first image to generate a second image, and provides the second image to the AI processor 102. The AI processor 102 detects the second image to obtain a detection result, and then provides the detection result to the central processing unit 107. The central processing unit 107 may perform a subsequent screen on procedure based on the image detection result from the AI processor 102.

In this embodiment of this disclosure, a signal for indicating to turn on the screen may be triggered by the ambient light sensor 103 based on the light intensity variation. Usually, the ambient light sensor 103 may be configured to sense light intensity of ambient light. The ambient light sensor 103 usually has relatively high sensitivity, and even a slight light intensity variation can be sensed by the ambient light sensor 103. For example, regardless of indoors or outdoors, a light intensity variation caused due to a slight movement of the electronic device or a light intensity variation caused by extending the hand or the face towards the electronic device may be captured by the ambient light sensor 103. When detecting the light intensity variation, the ambient light sensor 103 provides the signal that indicates the light intensity variation to the controller 101 so that the controller 101 triggers another component to work to perform a screen on procedure. Specifically, the ambient light sensor 103 determines a light intensity value in a preset period, and when detecting that there is a change between two adjacent determined light intensity values, writes information that indicates the light intensity variation into a first register in the SoC. For example, "1" is written into the first register. In addition, the ambient light sensor 103 may further determine a variation value of the light intensity value, and then write determined variation value information into a second register in the SoC. In other words, different registers may be used to respectively record whether there is a light intensity variation and a variation value by which the light intensity varies.

The controller 101 may read information from the first register or the second register based on a preset period, and when the information read by the controller 101 from the first register or the second register indicates a light intensity variation, may process the signal that indicates the light intensity variation, to generate a signal for controlling the camera apparatus 105 to collect an image, and send the signal for controlling the camera apparatus 105 to collect an image to the camera apparatus 105. There may be two implementations in which the controller 101 generates the signal for controlling the camera apparatus 105 to collect an image. In a first implementation, the controller 101 may periodically read information from the first register. When the read information is used to indicate the light intensity variation (for example, the information is "1"), the signal for controlling the camera apparatus 105 to collect an image is generated. In a second implementation, the controller 101 may periodically read information from the second register. Then, the controller 101 compares the read information with a preset threshold, and when determining that the information read from the second register is greater than or equal to the preset threshold, generates the signal for controlling the camera apparatus 105 to collect an image. An implementation to be used may be written into the controller 101 in advance by using a software program.

In the electronic apparatus shown in this embodiment of this disclosure, the controller triggers, based on the light intensity variation or variation value information of ambient light intensity, the camera apparatus to switch from the low power state to the working state, so that the electronic apparatus performs subsequent image detection, and further triggers, based on the image detection result, the electronic apparatus to perform a response operation. In this way, the camera apparatus can be triggered by the light intensity variation to work, to save electric energy of the electronic apparatus, so that a standby time of the electronic apparatus is prolonged when the electronic apparatus can perform a response operation. It should be understood that the triggering a component in this embodiment of this disclosure may be controlling or indicating the component to start to work, for example, switch from a low power state to a working state. This includes but is not limited to operations such as turning on a supply voltage of the component, turning on a clock of the component, increasing a frequency of the clock, and increasing the supply voltage. Correspondingly, switching from the working state to the low power state may include but is not limited to operations such as turning off the supply voltage of the component, turning off the clock of the component, lowering the frequency of the clock, and lowering the supply voltage.

For example, when work of the camera apparatus 105 is completed, the controller 101 may further control the camera apparatus 105 to enter a low power state. Therefore, the controller 101 triggers, based on the light intensity variation or the variation value information of the light intensity, the camera apparatus 105 to collect an image, so that the camera apparatus 105 is in the low power state when the camera apparatus 105 does not work, to save electric energy of the electronic device, so as to prolong a standby time of the electronic device. In the low power state, the camera apparatus 105 does not collect an image. Correspondingly, the camera apparatus 105 normally works in a working state, that is, collects an image. For another component in subsequent embodiments, there are also two states, namely, a low power state and a normal working state. The low power state in this embodiment of this disclosure may include but is not limited to a standby state, a power-off state, or a sleep state.

Switching from the low power state to the working state may be understood as triggering or wake-up in the foregoing embodiment. Switching from the working state to the low power state may be understood as stopping normal work. In addition, the ambient light sensor 103 is disposed, and the ambient light sensor 103 senses the light intensity variation to trigger the controller 101 to perform the subsequent screen on procedure, so that the user can trigger the subsequent screen on procedure without coming into contact with the electronic device, to improve user experience.

The controller 101 may further communicate with each of the image signal processor 104 and the AI processor 102, to control the image signal processor 104 to enter a low power state, wake up the AI processor 102, control the AI processor 102 to enter a low power state, or the like. As described above, the wake-up described herein may include but is not limited to wake up from the power-off state to a power-on working state, wake-up from the sleep state to the working state, or wake-up from the standby state to the working state. In specific practice, the controller 101 may maintain a bitmap. The bitmap may be stored in a register, and every two bits in the bitmap represent one component. For example, when a component needs to enter a power-off state, bits corresponding to the corresponding component in the bitmap may be set to 00, to trigger the component to be powered off; when a component needs to enter a working state, bits corresponding to the corresponding component in the bitmap may be set to 11, to trigger the component to work; or when a component needs to enter a sleep state, bits corresponding to the corresponding component in the bitmap may be set to 10, to trigger the component to enter the sleep state. FIG. 3 is an example of a schematic diagram of the bitmap. In FIG. 3, a first bit and a second bit from the left represent the AI processor 102. When the bits used to represent the AI processor 102 are "00", the AI processor 102 is indicated to be powered off. When the bits used to represent the AI processor 102 are "11", the AI processor 102 is indicated to be powered on to enter a working state. A third bit and a fourth bit from the left represent the image signal processor 104. When the bits used to represent the image signal processor 104 are "00", the image signal processor 104 is indicated to be powered off. In addition, when the electronic apparatus 100 shown in this embodiment of this disclosure further includes a component such as the camera apparatus 105 described in this embodiment of this disclosure, the controller 101 may further communicate with the camera apparatus 105 to trigger the camera apparatus 105 to enter a working state or a sleep state. Specifically, in FIG. 3, a fifth bit and a sixth bit from the left may represent the camera apparatus 105. When the bits used to represent the camera apparatus 105 are "10", the camera apparatus 105 is indicated to enter a sleep state.

It should be noted that in this embodiment of this disclosure, each component that can be controlled by the controller 101 has at least two power supply states (examples of three states, namely, a working state, a power-off state, and a sleep state, are shown in this embodiment of this disclosure). Therefore, two bits are required to indicate a power supply state of one component. In some other implementations, if each component that can be controlled by the controller 101 has only two power supply modes (for example, a working state and a power-off state), one bit in the bitmap may be used to indicate a power supply state of one component. Further, if each component that can be controlled by the controller 101 has at least four power supply states, three bits in the bitmap may be used to indicate a power supply state of one component. This is not limited in embodiments of this disclosure.

In conclusion, it may be learned that the controller 101 is only configured to: detect a signal that indicates a light variation, control, based on the signal that indicates the light variation, another component to enter a working state, control, when the another component completes work, the another component to enter a low power state, and the like, and the controller 101 does not need to perform a large amount of calculation. Therefore, there is usually relatively small power consumption, and even if the controller 101 is in the working state for a long time, impact on overall power consumption of the electronic device is very small, and may be approximately ignored. In addition, when each component needs to work, the controller 101 controls the component to be powered on, and after each component completes work, controls the component to be powered off or enter a low power mode, to avoid a case in which the electronic device has excessively high power consumption due to continuous running of the component, so as to prolong a standby time of the electronic device.

The image signal processor 104 may be configured to perform image processing on the image obtained by the camera apparatus 105. The image processing may specifically include but is not limited to white balance correction, gamma correction, color correction, lens correction, or black level compensation. In specific implementation, the image signal processor 104 may obtain an image from the camera apparatus 105, process the obtained image, and provide a processed image to the AI processor 102. In addition, after providing the processed image to the AI processor 102, the image signal processor 104 may send a signal indicating that image processing is completed to the controller 101. After receiving the signal, the controller 101 may control the image signal processor 104 to enter the low power state. That is, the image processor 104 wakes up based on the image provided by the camera apparatus 105, to perform image processing, and after image processing is completed, the image signal processor 104 is indicated, by using the controller 101, to enter the low power state. In this way, the image processor 104 is in the working state only in a working process, and is in the low power state in other time, and therefore power consumption of the image processor 104 can be further reduced, to reduce power consumption of the electronic device, so as to prolong a standby time of the electronic device.

The AI processor 102 may include a dedicated processor such as a neural-network processing unit (NPU). After receiving a power-on instruction from the controller 101, the AI processor 102 detects the obtained image to determine whether an object presented in the obtained image is a target object. The AI processor 102 may send a detection result to the central processing unit 107. Optionally, before receiving the detection result, the central processing unit 107 may be in a low power state. Before or when sending the detection result, the AI processor 102 sends a control signal to the central processing unit 107 to wake up the central processing unit 107, in other words, control the central processing unit 107 to enter a working state. The central processing unit 107 may determine, based on the detection result, whether to turn on the screen. In addition, after completing image detection, the AI processor 102 may further send a signal indicating that image detection is completed to the controller 101, so that the controller 101 controls, in response to the signal indicating that image detection is completed, the AI processor to enter a low power state. The AI processor 102 may run a target detection model. The target detection model is obtained by training a neural network (for example, a standard neural network or a convolutional neural network) by using a training sample in advance. That is, when the AI processor 102 runs, only an inference process of the target detection model is performed.

The target detection model is described below in detail by using several scenarios.

In a first scenario in this embodiment of this disclosure, the user may turn on the screen by using a gesture. The target detection model may be a gesture detection model. The gesture detection model may specifically include a hand detection model and a gesture classification model. Herein, for example, the gesture may include but is not limited to a palm-extending gesture shown in FIG. 1*a*, a scissor gesture shown in FIG. 1*b*, or a fist clenching gesture. A palm-extending gesture is used as an example. A hand recognition model may be obtained by training a first neural network in a supervised training manner by using a large quantity of positive sample images in which a hand is presented and a large quantity of negative sample images in which no hand is presented. The hand recognition model is used to detect whether a hand object is presented in an image and a coordinate region of the hand object in the image. The gesture classification model may be obtained by training a second neural network in a supervised training manner by using a large quantity of positive sample images in which a palm gesture is presented and a large quantity of negative sample images in which another gesture is presented. In specific disclosure, the image obtained by the camera apparatus 105 is first transmitted to the hand detection model to detect whether a hand object is present in the image. When detecting that a hand object is presented in the image, the hand detection model may output information indicating that a hand object is presented in the image and a location region of the hand object in the image. The AI processor may obtain a hand image from the image through cropping based on an output result, and input the hand image to the gesture classification model. The gesture classification model is used to detect whether a gesture presented in the hand image is a palm-extending gesture, and output, based on a detection result, information used to indicate whether the gesture is a palm-extending gesture. In this scenario, the user usually cannot customize a gesture, and the user can turn on the screen by using only a gesture that can be detected by the gesture detection model. In addition, in this scenario, it cannot be detected whether there is an owner. Therefore, to improve security of the electronic device and protect privacy of the owner, turning on the screen in this scenario may be that the screen is waken up to display a screen saver interface, but no unlocking is performed to enter a home screen.

In a second scenario in this embodiment of this disclosure, the user may turn on the screen by using a face. In this case, the target detection model may be a facial detection model. The facial detection model may be used to detect whether a facial object is presented in an image, posture information of the presented facial object, a quantity of presented facial objects, and the like. In specific implementation, the facial detection model may be obtained by training a neural network in a supervised training manner by using a large quantity of sample images presenting a face and a large quantity of sample images presenting no face. The sample image presenting a face may further include but is not limited to a sample image presenting one face, a sample image presenting a plurality of faces, and a sample image presenting various facial postures and forms. In this scenario, the facial detection model is obtained through training by using facial images of a plurality of users as positive sample images, and therefore the facial detection model usually can only detect whether a facial image is presented in an image, and cannot detect whether an object presented in the image is an owner. To improve security of the electronic device and protect privacy of the owner, turning on the screen in this scenario may be that the screen is waken up to display a screen saver interface, but no unlocking is performed to enter a home screen.

In a possible implementation, a plurality of target detection models may be set in the AI processor 102. For example, one model is used to detect a gesture, and another model is used to detect a face, so that the user can choose a specific manner to perform screen on. However, the AI processor 102 may run one target detection model. When the user turns on the screen by using a gesture, the AI processor 102 runs the gesture detection model. When the user turns on the screen by using a face, the AI processor 102 runs the facial detection model.

To further improve user experience, the screen may be turned on, and unlocking is performed to enter the home screen. The screen needs to be unlocked. Therefore, in consideration of security, an identity of the device user usually needs to be verified. In this case, the AI processor 102 may further perform feature extraction and comparison.

In a scenario in which the screen is turned on by using a gesture, an identity of the owner may be verified by using a fingerprint or palmprint comparison method. Specifically, when the user selects a service of turning on the screen by using a gesture and performing unlocking to enter the home screen, the screen on disclosure may drive the central processing unit to collect fingerprint information or palmprint information of the owner by using the camera apparatus or an infrared sensor apparatus, and use the fingerprint information or the palmprint information as a template for subsequent comparison. When the user triggers screen on by using a fingerprint or a palmprint, and unlocks the screen, the AI processor 102 may first detect, by using the gesture detection model, whether a predetermined gesture is presented in an image. It is assumed that the predetermined gesture is a palm-extending gesture. When it is detected that a palm-extending gesture is presented in the image, a palmprint presented in the collected image may be further compared with the pre-stored palmprint information, namely, the template, to determine whether the palmprint matches the palmprint information.

In a scenario in which the screen is turned on by using a face, an identity of the owner may be verified by using a face comparison method. Specifically, when the user selects a service of turning on the screen by using a face and performing unlocking to enter the home screen, the screen on disclosure may drive the central processing unit to obtain facial information of the owner collected by the camera apparatus or a sensor apparatus, and use the facial information as a template for subsequent comparison. When the user triggers screen on by using a face, and unlocks the screen, the AI processor 102 may first detect, by using the facial detection model, whether a facial object is presented in an image, a quantity of presented facial objects, and posture information of the facial object in the image. When it is detected that a facial object is presented in the image, the facial object presented in the collected image may be further compared with the pre-stored facial information, namely, the template, to determine whether the facial object matches the facial information.

In a possible implementation, in the scenario in which the screen is turned on by using a gesture, the gesture used for turning on the screen may be user-defined. Specifically, when the user turns on the screen by using a gesture set in a user-defined manner, the screen on disclosure may drive the central processing unit 107 to collect a gesture image of the user-defined gesture by using the camera apparatus 105, and use the gesture image as a template for subsequent comparison. When the user triggers screen on, the AI processor 102 may compare an object presented in the obtained image with the pre-stored gesture image, namely, the template, to determine whether the object matches the gesture image.

Optionally, after receiving the signal that indicates the light intensity variation from the ambient light sensor 103, the controller 101 may generate the signal for triggering the camera apparatus 105 to collect an image, and provide the signal to the camera apparatus 105. After receiving the signal from the controller 101, the camera apparatus 105 may obtain an image through photographing, and then provide the obtained image to the image signal processor 104. When receiving the signal indicating that image processing is completed from the image signal processor 104, the controller 101 may further control the camera apparatus 105 to enter the low power state.

In a possible implementation, to save a layout area, the ambient light sensor 103 may be disposed in the camera apparatus 105, or the ambient light sensor 103 and the camera apparatus 105 are integrated to form a module, in other words, the ambient light sensor 103 may be selectively disposed in the camera apparatus 105. This is not limited in this embodiment.

In this embodiment of this disclosure, the storage device 106 may include a random access memory (RAM). The random access memory may include a volatile memory (for example, an SRAM, a DRAM, a DDR (double data rate SDRAM) or an SDRAM) and a nonvolatile memory. The RAM may store data (for example, pre-stored user facial information, a pre-stored user gesture image, and pre-stored user palmprint information) and a parameter required for running of the AI processor 102, intermediate data generated during running of the AI processor 102, an output result existing after running of the AI processor 102, and the like. In addition, the image signal processor 104 may further store the processed image in the RAM. During running, the AI processor 102 may obtain the processed image, the pre-stored user facial information, the pre-stored user gesture image, the pre-stored user palmprint information, and the like from the RAM. The central processing unit 107 may obtain the output result of the AI processor 102 from the RAM. In addition, the storage device 106 may further include a read-only memory ROM. The read-only memory ROM may store executable programs of the controller 101, the AI processor 102, the image signal processor 104, and the central processing unit 107. The components may perform respective work by loading the executable programs.

Optionally, the storage device 106 includes different types, and may be integrated into the first semiconductor chip SoC, or may be integrated into the second semiconductor chip different from the first semiconductor chip SoC in the electronic apparatus 100.

In this embodiment, the electronic apparatus 100 may further include a communications unit (not shown in the figure). The communications unit includes but is not limited to a near field communication unit or a mobile communications unit. The near field communication unit exchanges, by running a short-range wireless communications protocol, information with a terminal that is located outside a mobile terminal and that is configured to access the internet. The short-range wireless communications protocol may include but is not limited to various protocols supported in a radio frequency identification technology, a Bluetooth communication technology protocol, or an infrared communication protocol. The mobile communications unit accesses the internet by running a cellular wireless communications protocol and a radio access network, to implement information exchange between the mobile communications unit and a server that supports various disclosures in the internet. The communications unit may be integrated into the first semiconductor chip. In addition, the electronic apparatus 100 may optionally include a bus, an input/output port I/O, a storage controller, or the like. The storage controller is configured to control the storage device 106. The bus, the input/output port I/O, the storage controller, and the like may be integrated into the first semiconductor chip with the controller 101, the AI processor 102, and the like. It should be understood that in actual disclosure, the electronic apparatus 100 may include more or fewer components than those shown in FIG. 2a. This is not limited in this embodiment of this disclosure.

Figure 4A:
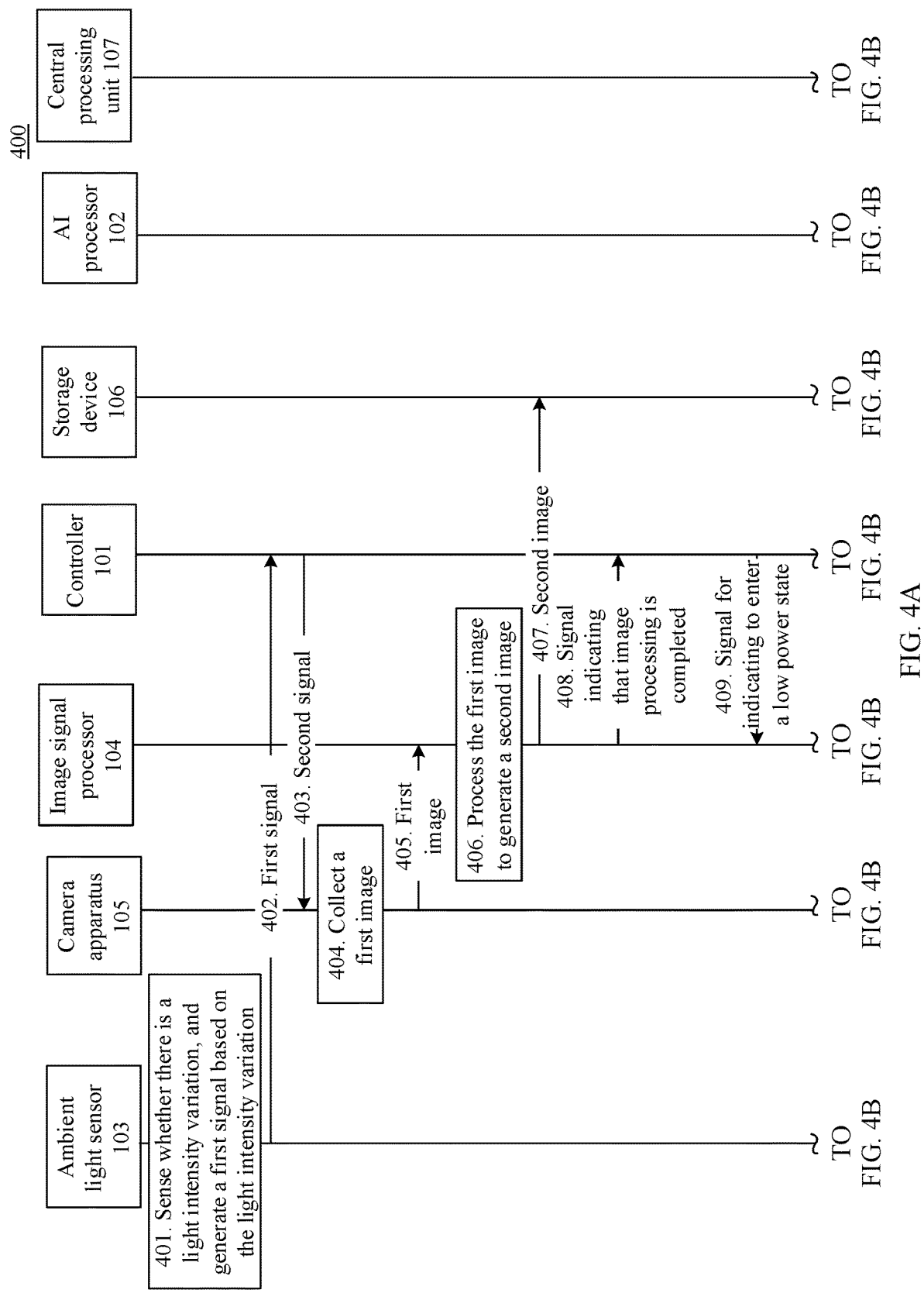
FIG. 4A and FIG. 4B are a schematic diagram of an interaction procedure between components according to an embodiment of this disclosure.
Figure 4B:
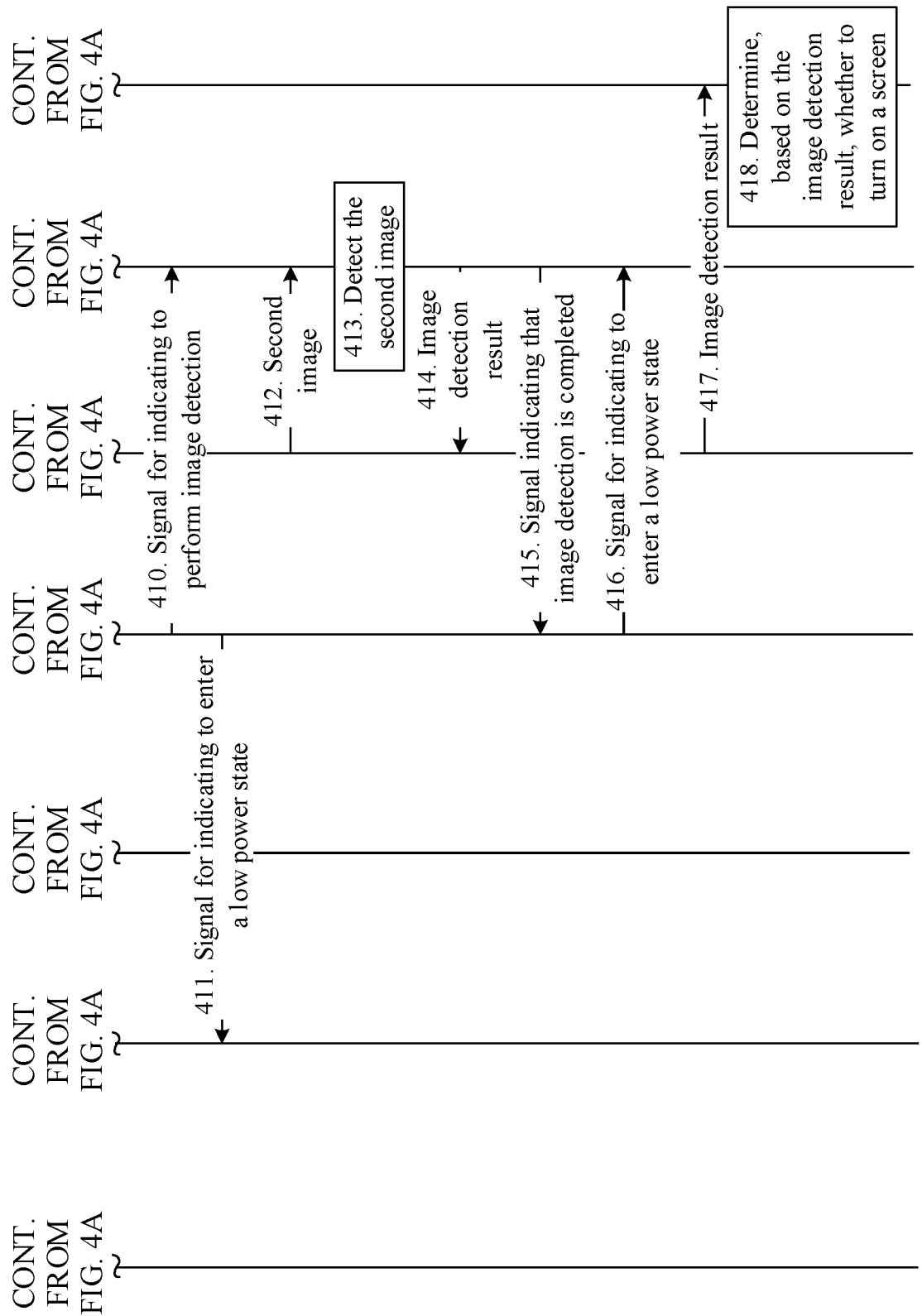

FIG. 4A and FIG. 4B are a schematic sequence diagram of a screen on method 400 according to an embodiment of this disclosure. The screen on method is applied to the electronic apparatus 100 shown in FIG. 2a. The screen on method 400 may include the following steps: Step 401: An ambient light sensor 103 senses whether there is a light intensity variation, and when sensing a light intensity variation, generates a first signal based on the light intensity variation. Step 402: The ambient light sensor 103 provides the first signal to a controller 101.

Step 403: The controller 101 detects whether the first signal is obtained from the ambient light sensor 103. When detecting the first signal, the controller 101 sends a second signal for triggering a camera apparatus 105 to collect an image to the camera apparatus 105. When the controller 101 does not detect the first signal, detection may continue to be performed until the first signal is detected. Step 404: The camera apparatus 105 collects a first image in response to the second signal. Step 405: The camera apparatus 105 provides the collected first image to an image signal processor 104. It should be noted that the image collected by the camera apparatus 105 may include a plurality of frames.

Step 406: The image signal processor 104 processes the first image provided by the camera apparatus 105, to generate a second image. Step 407: The image signal processor 104 stores the second image in a storage device 106. Step 408: After completing image processing, the image signal processor 104 sends a signal indicating that image processing is completed to the controller 101.

Step 409: The controller 101 sends a signal for indicating the image signal processor 104 to enter a low power state to the image signal processor 104 in response to the signal that is sent by the image signal processor 104 and that is used to indicate that image processing by the image signal processor 104 is completed. Step 410: The controller 101 sends a signal for indicating an AI processor 102 to perform image detection to the AI processor 102. Step 411: The controller 101 sends a signal for indicating the camera apparatus 105 to enter a low power state to the camera apparatus 105.

Step 412: The AI processor 102 obtains the second image stored in the image signal processor 104 from the storage device 106 in response to the signal that is sent by the controller 101 and that is used for indicating to perform image detection. Step 413: The AI processor 102 detects the second image. Step 414: The AI processor 102 stores a detection result in the storage device 106. Step 415: The AI processor 102 sends a signal indicating that image detection is completed to the controller 101.

Step 416: The controller 101 sends a signal for indicating the AI processor 102 to enter a low power state to the AI processor 102 in response to the signal indicating that image detection is completed.

Step 417: A central processing unit 107 obtains the image detection result from the storage device 106. Step 418: The central processing unit 107 controls, based on the image detection result, a screen to be turned on or remain in an off state.

It should be noted that in the steps shown in this embodiment of this disclosure, for a specific working mode of each component, refer to the detailed description related to each component in the embodiment shown in FIG. 2a. Details are not described herein.

It should be understood that the steps or operations in the screen on method 400 shown in FIG. 4A and FIG. 4B are merely examples, and other operations or variations of the operations in FIG. 4A and FIG. 4B may be further performed in this embodiment of this disclosure. In addition, a sequence of the steps is not limited in this disclosure. For example, in the steps shown in FIG. 4A and FIG. 4B, steps 409, 410, and 411 may be simultaneously performed, and steps 414 and 415 may be simultaneously performed. More or fewer steps than those shown in FIG. 4A and FIG. 4B may be further included in this embodiment of this disclosure. For example, when a temporary storage apparatus such as a register is disposed in each of the central processing unit 107 and the AI processor 102, steps 407, 412, 414, and 417 may not need to be set, the image signal processor 104 may directly send the second image to the AI processor 102, and the AI processor 102 may directly send the detection result to the central processing unit 107. For another example, after the controller 101 sends the signal that is used for indicating the image signal processor 104 to enter the low power state and that is shown in step 409 to the image signal processor 104, the image signal processor 104 may enter the low power state based on the signal for entering the low power state. The step of entering the low power state by the image signal processor 104 is omitted in FIG. 4A and FIG. 4B.

Based on a time sequence of the screen on method 400 shown in FIG. 4A and FIG. 4B, a specific processing process of the AI processor 102 and a subsequent procedure performed by the central processing unit 107 based on the detection result of the AI processor 102 are described below in detail by using specific scenarios.

Figure 5:
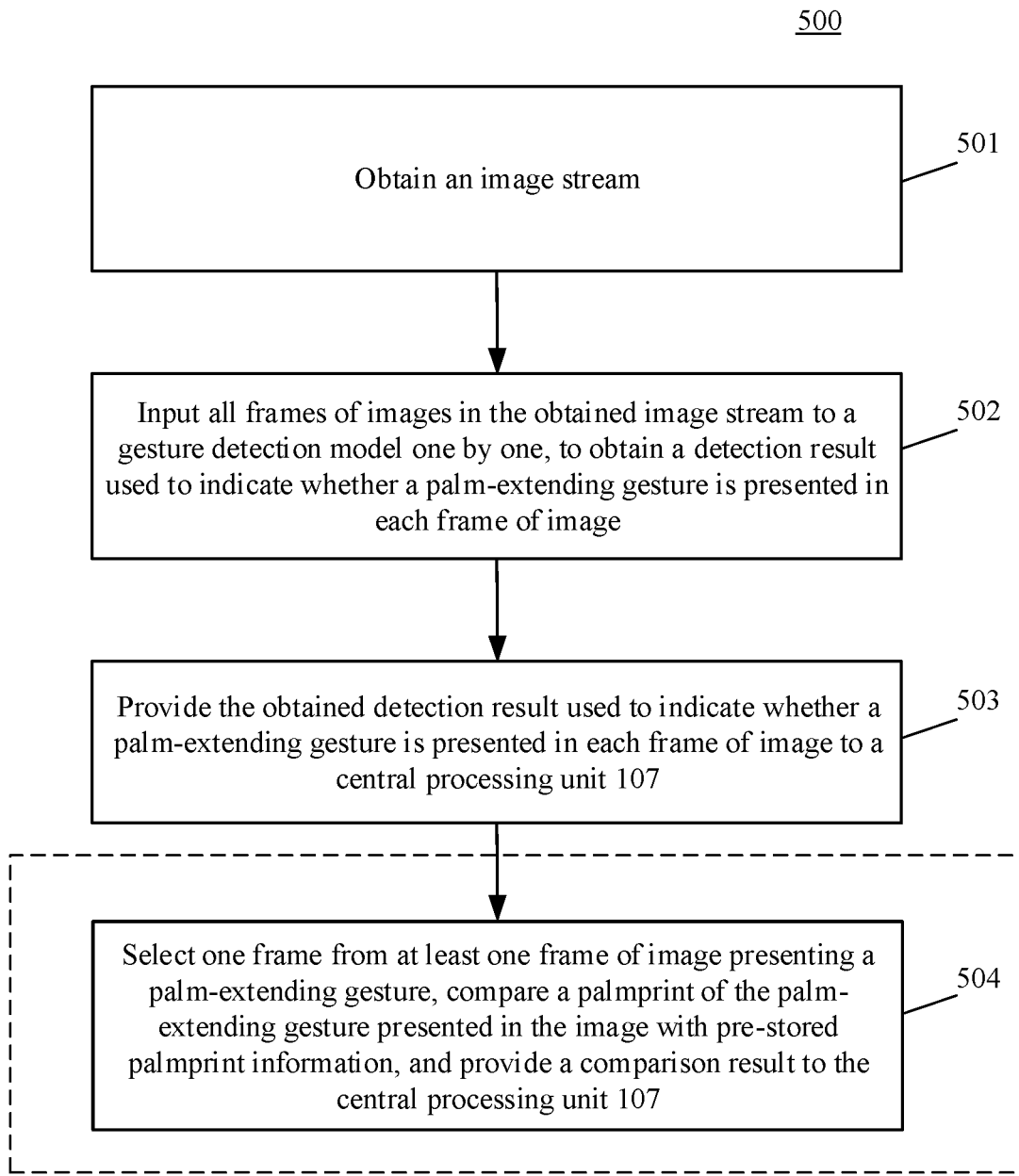
FIG. 5 is a flowchart of a gesture detection method applied to an AI processor according to an embodiment of this disclosure.

A detection procedure performed by the AI processor 102 is described by using the scenario in which a screen is turned on by using a palm-extending gesture and that is shown in FIG. 1a as an example. FIG. 5 shows an example of a gesture detection method 500 for turning on a screen by using a palm-extending gesture. Detection steps in the gesture detection method 500 include: Step 501: Obtain an image stream. The image stream may be obtained from the image signal processor 104 after a captured image stream is provided by the camera apparatus 105 to the image signal processor 104 and is processed by the image signal processor 104. Alternatively, the image stream may be obtained by the AI processor 102 from the storage device 106 after the image signal processor 104 stores the image stream in the storage device 106.

Step 502: Input all frames of images in the obtained image stream to a gesture detection model one by one, to obtain a detection result used to indicate whether a palm-extending gesture is presented in each frame of image. For a specific training method of the gesture detection model, refer to the related description of the gesture detection model in the electronic apparatus 100 shown in FIG. 2a. Details are not described herein.

Step 503: Provide the obtained detection result used to indicate whether a palm-extending gesture is presented in each frame of image to the central processing unit 107. Therefore, the central processing unit 107 may determine, based on the received gesture detection result, whether to turn on the screen. Specifically, a determining condition indicating whether to turn on the screen is preset in the central processing unit 107. For example, a palm-extending gesture is presented in the image, and a quantity of consecutive images presenting a palm-extending gesture is greater than or equal to a preset quantity (for example, three frames). When the detection result provided by the AI processor 102 is used to indicate that no palm-extending gesture is presented in the image, or the quantity of consecutive images presenting a palm-extending gesture is less than the preset quantity, the central processing unit 107 may maintain the off state of the screen. When the detection result provided by the AI processor 102 is used to indicate that the quantity of consecutive images presenting a palm-extending gesture is greater than or equal to the preset quantity, the central processing unit 107 may indicate to turn on the screen to present a screen saver interface.

It should be noted that by detecting the quantity of consecutive images presenting a palm-extending gesture, it may be determined whether a palm of a user is in a hovering state. In some scenarios, the palm of the user is just shaken before the camera apparatus 105, and the user may not want to turn on the screen in this case. However, the palm-extending gesture happens to be collected by the camera apparatus 105, and an image presenting a palm-extending gesture is provided to the AI processor 102. Consequently, the central processing unit 107 is triggered to further turn on the screen, which degrades user experience. A probability that the foregoing scenario occurs may be reduced by determining whether a palm-extending gesture is presented in a plurality of consecutive frames of images. Therefore, an optimal occasion for turning on the screen may be provided, to help improve user experience.

In some scenarios, the AI processor 102 may further perform step 504. Step 504: Select one frame from at least one frame of image presenting a palm-extending gesture, compare a palmprint of the palm-extending gesture presented in the image with pre-stored palmprint information, and provide a comparison result to the central processing unit 107.

In addition, the central processing unit 107 determines, based on the palmprint comparison result provided by the AI processor 102, whether the screen needs to be further unlocked to enter a home screen. When the palmprint comparison result is used to indicate that a similarity value between the palmprint of the palmprint gesture and the pre-stored palmprint information is greater than or equal to a preset threshold, the central processing unit 107 may indicate to further unlock the screen to present the home screen. When the palmprint comparison result is used to indicate that a similarity value between the palmprint of the palmprint gesture and the pre-stored palmprint information is less than a preset threshold, the central processing unit 107 may indicate to forbid screen unlocking.

Figure 6:
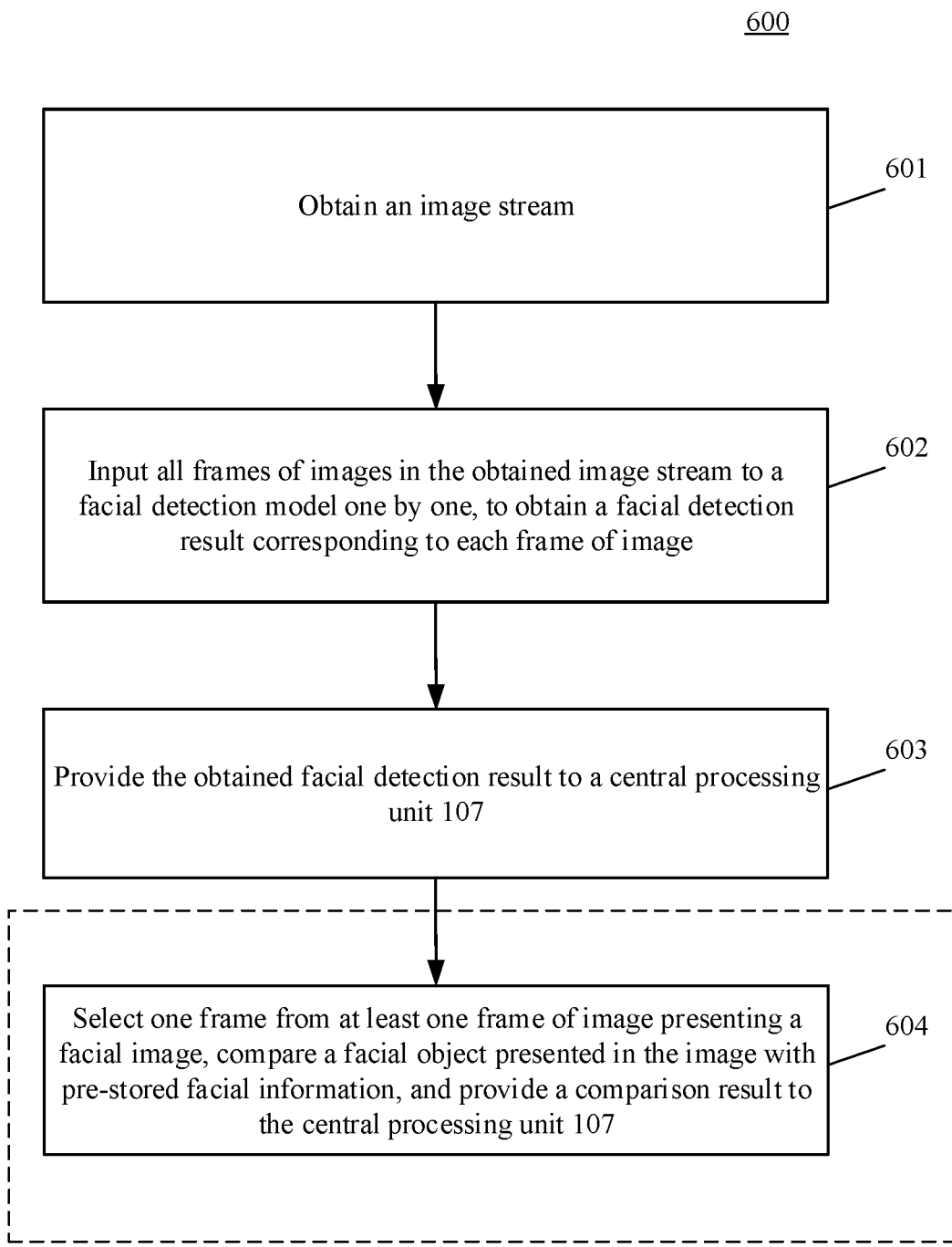
FIG. 6 is a flowchart of a facial detection method applied to an AI processor according to an embodiment of this disclosure.

A detection procedure performed by the AI processor 102 is described below by using the scenario in which a screen is turned on by using a face and that is shown in FIG. 1c as an example. FIG. 6 shows an example of a facial detection method 600 for turning on a screen by using a face. Detection steps in the facial detection method 600 include:

Step 601: Obtain an image stream. For a manner of obtaining the image stream, refer to the obtaining manner in step 501 shown in FIG. 5. Details are not described herein.

Step 602: Input all frames of images in the obtained image stream to a facial detection model one by one, to obtain a facial detection result corresponding to each frame of image. The facial detection result includes at least one of the following: whether a facial image is presented in the image, a quantity of presented facial images, and posture information of the presented facial image. For a specific training method of the facial detection model, refer to the related description of the facial detection model in the electronic apparatus 100 shown in FIG. 2a. Details are not described herein.

Step 603: Provide the obtained facial detection result to the central processing unit 107. Therefore, the central processing unit 107 may determine, based on the received facial detection result, whether to turn on the screen. Specifically, a determining condition indicating whether to turn on the screen may be preset in the central processing unit 107. For example, a facial image is presented in the image, a posture of the presented facial image is located in a preset angle range, and a quantity of consecutive images presenting a facial image is greater than or equal to a preset quantity (for example, three frames). When the facial detection result provided by the AI processor 102 is used to indicate that no facial image is presented in the image, or the quantity of consecutive images presenting a facial image is less than the preset quantity, the central processing unit 107 may maintain the off state of the screen. When the facial detection result provided by the AI processor 102 is used to indicate that the quantity of consecutive images presenting a facial image is greater than or equal to the preset quantity, and the posture of the presented facial image is located in the preset angle range, the central processing unit 107 may indicate to turn on the screen to present a screen saver interface.

In some scenarios, the AI processor 102 may further perform step 604. Step 604: Select one frame from at least one frame of image presenting a facial image, compare a facial object presented in the image with pre-stored facial information, and provide a comparison result to the central processing unit 107.

In addition, the central processing unit 107 may further determine, based on the facial comparison result sent by the AI processor 102, whether the screen needs to be further unlocked to present a home screen on the screen. When the facial comparison result is used to indicate that a similarity value between the facial object and the pre-stored facial information is greater than or equal to a preset threshold, the central processing unit 107 may indicate to further unlock the screen to present the home screen. When the facial comparison result is used to indicate that a similarity value between the facial object and the pre-stored facial information is less than a preset threshold, the central processing unit 107 may indicate to forbid screen unlocking.

It should be noted that by detecting the quantity of consecutive images presenting a facial contour, it may be determined whether a face of a user is in a hovering state. In some scenarios, the face of the user is just shaken before the camera apparatus 105, and the user may not want to turn on the screen in this case. However, the face of the user happens to be collected by the camera apparatus 105, and an image presenting a facial object is provided to the AI processor. Consequently, the central processing unit 107 is triggered to further turn on the screen, which degrades user experience. A probability that the foregoing scenario occurs may be reduced by determining whether a facial object is presented in a plurality of consecutive frames of images. Therefore, an optimal occasion for turning on the screen may be provided, to help improve user experience.

It may be understood that to implement the foregoing functions, the electronic apparatus includes corresponding hardware and/or corresponding software modules for performing the functions. The example algorithms and steps described with reference to the embodiments disclosed in this specification can be implemented in this disclosure by using hardware or a combination of hardware and computer software. Whether a function is performed by hardware or hardware driven by computer software depends on a particular disclosure and a design constraint of the technical solutions. A person of ordinary skill in the art may use different methods to implement the described functions for each particular disclosure, but it should not be considered that the implementation goes beyond the scope of this disclosure.

In the embodiments, the one or more processors may be divided into functional modules based on the foregoing method examples. For example, each functional module may be obtained through division based on each corresponding function, or two or more functions may be integrated into one processing module. The integrated module may be implemented in a form of hardware. It should be noted that, in embodiments of this disclosure, division into the modules is an example and is merely logical function division, and may be other division in an actual implementation.

Figure 7:
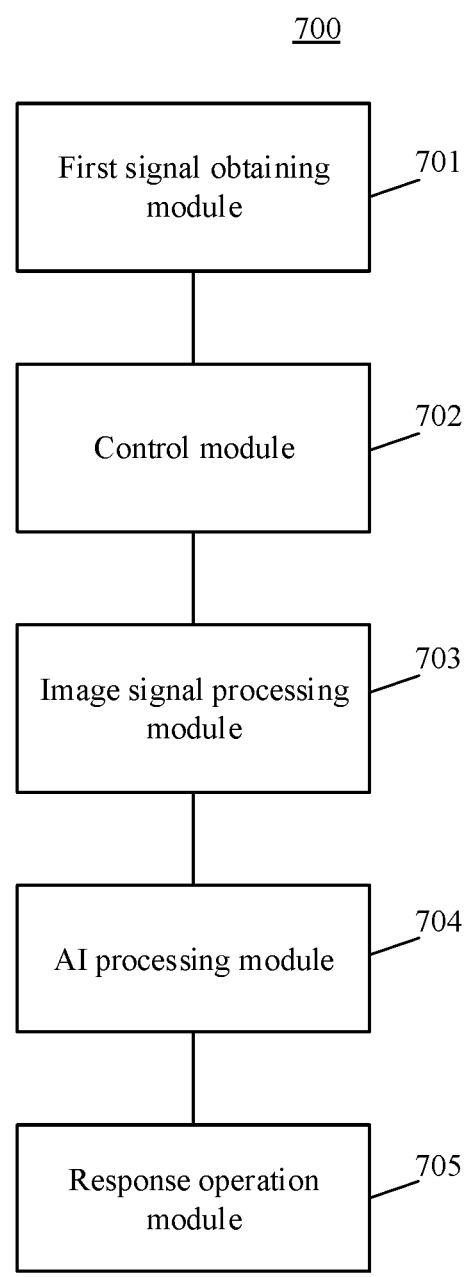
FIG. 7 is a schematic diagram of a software structure of an electronic apparatus according to an embodiment of this disclosure.

When each functional module is obtained through division based on each corresponding function, FIG. 7 is a schematic diagram of possible composition of an apparatus 700 in the foregoing embodiments. As shown in FIG. 7, the apparatus 700 may include a first signal obtaining module 701, a control module 702, an image signal processing module 703, an AI processing module 704, and a response operation module 705.

The first signal obtaining module 701 is configured to obtain, by using an ambient light sensor, a first signal that indicates a light intensity variation. The control module 702 is configured to trigger, based on the first signal, a camera apparatus to collect a first image. The image signal processing module 703 is configured to process the first image to generate a second image. The AI processing module 704 is configured to detect the second image to obtain an image detection result. The response operation module 705 is configured to perform a response operation based on the image detection result.

In a possible implementation, the control module 702 is further configured to trigger, based on the first signal, the AI processor to detect the second image, to obtain the image detection result.

In a possible implementation, the control module 702 is further configured to: after the AI processor detects the second image, control the AI processor to enter a low power state.

In a possible implementation, the control module 702 is further configured to: after the first image is processed to generate the second image, control the image signal processor that processes the first image to enter a low power state.

In a possible implementation, the response operation includes controlling a screen corresponding to the apparatus 700 to be turned on.

The apparatus 700 provided in this embodiment is configured to perform the response operation method performed by the electronic apparatus 100. Therefore, effect the same as those of the implementation method can be achieved. Each module corresponding to FIG. 7 may be implemented by using software, hardware, or a combination thereof. For example, each module may be implemented in a form of software, corresponds to a processor corresponding to the module in FIG. 2b, and is configured to drive the corresponding processor to work. Alternatively, each module may include two parts, namely, a corresponding processor and corresponding driver software.

When an integrated unit is used, the apparatus 700 may include at least one processor and a memory. For details, refer to FIG. 2b. The at least one processor may invoke all or a part of a computer program stored in the memory to control and manage an action of the electronic apparatus 100, for example, may be configured to support the electronic apparatus 100 in performing the steps performed by the foregoing modules. The memory may be configured to support the electronic apparatus 100 in executing stored program code, data, and the like. The processor may implement or execute various example logic modules described with reference to disclosure of this disclosure. The processor may be one or more microprocessor combinations that implement a computing function, for example, includes but is not limited to the controller 101, the image signal processor 104, the AI processor, and the central processing unit 107 shown in FIG. 2a. In addition, in addition to the processors shown in FIG. 2a, the processor may further include another programmable logic device, a transistor logic device, a discrete hardware component, or the like. The memory may be the storage device 106 shown in FIG. 2a.

An embodiment further provides a computer-readable storage medium. The computer-readable storage medium stores computer instructions. When the computer instructions are run on a computer, the computer is enabled to perform the related method steps, to implement the response operation method performed by the apparatus 700 in the foregoing embodiments.

An embodiment further provides a computer program product. When the computer program product is run on a computer, the computer is enabled to perform the related steps, to implement the response operation method performed by the apparatus 700 in the foregoing embodiments.

The computer-readable storage medium or the computer program product provided in the embodiments is configured to perform the corresponding method provided above. Therefore, for beneficial effect that can be achieved by the computer-readable storage medium or the computer program product, refer to the beneficial effect in the corresponding method provided above. Details are not described herein.

Based on descriptions about the foregoing implementations, a person skilled in the art may understand that, for a purpose of convenient and brief description, division into the foregoing functional modules is used as an example for illustration. In actual disclosure, the foregoing functions can be allocated to different modules and implemented based on a requirement, that is, an inner structure of an apparatus is divided into different functional modules to implement all or some of the functions described above.

In addition, functional units in embodiments of this disclosure may be integrated into one processing unit, each of the units may exist alone physically, or two or more units may be integrated into one unit. The integrated unit may be implemented in a form of hardware, or may be implemented in a form of a software function unit.

When the integrated unit is implemented in a form of a software function unit and sold or used as an independent product, the integrated unit may be stored in a readable storage medium. Based on such understanding, the technical solutions of embodiments of this disclosure essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor to perform all or some of steps of methods in embodiments of this disclosure. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

The invention claimed is:

1. An electronic apparatus, comprising:
   a controller configured to:
      obtain a first signal from an ambient light sensor; and
      generate a trigger signal when the first signal indicates a light intensity variation in the first signal from the ambient light sensor;
   a camera in communication with the controller, the camera being configured to collect a first image based on the trigger signal from the controller;
   an image signal processor configured to receive the first image from the camera apparatus and process the first image to generate a second image,
   an artificial intelligence (AI) processor coupled to receive the second image and configured to obtain an image detection result; and
   a central processing unit configured to receive the image detection result and perform a response operation based on the image detection result.

2. The electronic apparatus according to claim 1, wherein the camera apparatus is configured to collect the first image based on the trigger signal generated by the controller.

3. The electronic apparatus according to claim 1, wherein the controller is further configured to trigger, based on the first signal, the AI processor to detect the second image; and
   the AI processor is configured to detect the second image to obtain the image detection result based on the trigger signal generated by the controller.

4. The apparatus according to claim 1, wherein the image signal processor is further configured to send a third signal to the controller, the third signal indicating that processing of the first image is completed; and
   the controller is further configured to control, in response to the third signal, the image signal processor to enter a low power state.

5. The apparatus according to claim 1, wherein the response operation comprises controlling a screen corresponding to the electronic apparatus to be turned on.

6. The electronic apparatus according to claim 1, further comprising recording a light intensity variation occurrence.

7. The electronic apparatus according to claim 1, further comprising recording a variation value of the light intensity variation.

8. The electronic apparatus according to claim 1, wherein the light intensity variation occurs within a preset period.

9. The apparatus according to claim 3, wherein the AI processor is further configured to send a second signal to the controller indicating that detection of the second image is completed; and the controller is further configured to control, in response to the second signal, the AI processor to enter a low power state.

10. The apparatus according to claim 4, wherein the controller is further configured to control, in response to the third signal, the camera apparatus to enter a low power state.

11. A response operation method for an electronic apparatus, the method comprising:

obtaining a first signal from an ambient light sensor;
generating a trigger signal when the first signal indicates a light intensity variation in the first signal from the ambient light sensor;
triggering a camera apparatus to collect a first image, the triggering being based on the trigger signal;
processing the first image to generate a second image;
detecting the second image to obtain an image detection result; and
performing a response operation based on the image detection result.

12. The method according to claim 11, wherein the detecting the second image to obtain the image detection result comprises:

triggering, based on the first signal, an AI processor to detect the second image, to obtain the image detection result.

13. The method according to claim 11, wherein after the processing the first image to generate a second image, the method further comprises controlling an image signal processor to enter a low power state, wherein the image signal processor processes the first image to enter a low power state.

14. The method according to claim 11, wherein the response operation comprises controlling a screen corresponding to the electronic apparatus to be turned on.

15. The response operation method according to claim 11, further comprising recording a light intensity variation occurrence.

16. The response operation method according to claim 11, further comprising recording a variation value of the light intensity variation.

17. The response operation method according to claim 11, wherein the light intensity variation occurs within a preset period.

18. The method according to claim 12, wherein after the detecting the second image by the AI processor, the method further comprises controlling the AI processor to enter a low power state.

19. An electronic apparatus, comprising:

a memory storing instructions; and
at least one processor in communication with the memory, the at least one processor configured, upon execution of the instructions, to perform the following steps:
obtaining a first signal from an ambient light sensor;
generating a trigger signal when the first signal indicates a light intensity variation in the first signal from the ambient light sensor;
triggering a camera apparatus to collect a first image, the triggering being based on the trigger signal;
processing the first image to generate a second image;
detecting the second image to obtain an image detection result; and
performing a response operation based on the image detection result.

20. The electronic apparatus according to claim 19, wherein the detecting the second image to obtain the image detection result comprises:

triggering, based on the first signal, an AI processor to detect the second image, to obtain the image detection result.

21. The electronic apparatus according to claim 2, wherein after the detecting the second image by the AI processor, the at least one processor further executes the instructions to perform the step of controlling the AI processor to enter a low power state.

22. The electronic apparatus according to claim 20, wherein after the processing the first image to generate a second image, the at least one processor further executes the instructions to perform the step of controlling an image signal processor that processes the first image to enter a low power state.

23. The electronic apparatus according to claim 20, wherein the response operation comprises controlling a screen corresponding to the electronic apparatus to be turned on.

* * * * *